Patented Nov. 12, 1929

1,735,000

UNITED STATES PATENT OFFICE

JOSEPH G. DELY, OF NEW YORK, N. Y., ASSIGNOR TO CHEMICAL RESEARCH & DESIGNING CORPORATION, OF NEW YORK, N. Y., A CORPORATION OF NEW YORK

COPPER COATING

No Drawing. Application filed April 19, 1928. Serial No. 271,411.

The invention relates to the art of coating metallic materials such as steel or iron plates with an adherent outer layer composed of metallic copper. The object of the invention is to produce a relatively continuous or imperforate layer of copper and to produce improved results over those obtained by known processes.

In one of the known methods of copper coating it has been proposed to mix a fine copper-bearing substance with heavy oils or the like to produce a viscous, paint-like substance which is then applied to rolled iron plates by printing rolls. The plates are then baked at high temperatures. On cooling, the plates are pickled in dilute sulfuric acid to remove the scale. The cleansed plates are rolled again and then become the finished product. Copper coating of plates thus made, while being apparently continuous, is in effect exceedingly porous with the result that the iron foundation is readily attackable and that the life of the plates in consequence is relatively short.

I have now discovered that the cause of the defect in this process is that the copper particles do not weld together in the baking step to any substantial degree, but merely form a superficial net-work spaced apart by a very large number of minute openings. This result, I find, is due to the fact that the atmosphere in the baking oven, although ordinarily regarded as a neutral or reducing agent, will, at the high temperatures in the baking oven, act as an oxidizing agent for metallic copper and thereby impede and/or obstruct welding together of the copper particles. The gases in the baking oven, when produced by the composition of natural gas, (a preferred fuel) contain steam and carbon dioxide and relatively little carbon monoxide. The cracking products of the oil used to make the initial paint-like mixture also inhibit the fusion of the copper. In order to give the copper particles an opportunity of welding together under conditions which will cleanse the copper particles and prevent their oxidation, I discard the use, in the first place, of oils or hydrocarbons in making the initial mixture, but apply the copper to the iron plates in association with material containing a substance such as sodium fluoride. Sodium fluoride is preferred, but sodium chloride or a mixture of sodium fluoride and sodium chloride may also be used.

A formula suitable for use in this connection may contain 4 grams of sodium fluoride with ¼ gram of borax and 1½ c. c. silicate of soda (40° Bé). The foregoing formula is computed with relation to 5 grams of copper in powdered form and, of course, sufficient water to give proper consistency. If the copper powder is mixed in at the outset, the resultant thick paste can be applied to the iron plates by means of printing rolls, but for certain purposes an operator may first dip the iron plates into a bath containing the sodium halide, borax, and silicate of soda, the powdered copper being subsequently applied in appropriate quantity. Iron plates coated with a composition of the described type will, when baked at high temperatures, have a surface of molten material within which the copper particles are not only cleansed, but protected against oxidation, and within which the copper particles may have a relative movement in settling against the iron surface and against each other, the molten slag tending to float upon the surface of the settled copper particles. The molten material thus offers protection from the time that the copper is first exposed to the possibility of attack by the gaseous environment existing in the heating chamber. The copper particles under the protective influence set forth then become welded to the iron foundation and to each other, forming a copper surface which, compared with the copper surfaces produced by the prior art fusion method, presents relatively large areas of truly continuous coating free from perforations or pin holes.

The sodium fluoride and sodium chloride slags are readily removable by pickling in dilute sulfuric acid. The slags of the borax-silicate of soda vehicle, if not accompanied by a halide of sodium, would be exceedingly difficult to remove.

The essential characteristics of the materials to be employed in accordance with my invention in connection with the fusing of copper particles upon the surface of a metallic object of ferrous character are that they must supply a body within which the copper particles may be completely enveloped as fusion progresses and such protection must be offered from the time that the copper, but for the protective coating, would begin to be subject to attack by the atmosphere prevailing in the heating chamber; that the body must operate as a cleanser for the copper particles; that it must fuse at temperature lower than copper and have a lower surface tension with respect to copper than copper has for copper or for ferrous material, and that the slag must be easily removable. These various requirements are satisfied pre-eminently by the use of a borax-silicate of soda vehicle containing a sodium halide and preferably sodium fluoride.

After the pickling operation, the coated plates produced by my process are preferably washed in the usual manner to remove the pickling fluid and loose particles of slag, and the plates are then given a final rolling treatment.

If the process is carried out with the addition of stannous oxide in the surfacing material the result will be a copper coating of the bronze types whose color would depend on the amount of the added tin material and any such modifications are intended to be included within the scope of my claims.

I claim:

1. The process of coating a metallic object with copper which comprises applying a coat to the object, said coat containing a halide of sodium and an inorganic vehicle of the silicate type for said halide and copper particles, and subjecting the thus prepared object to a high-temperature baking operation, whereby the copper particles are welded to each other and to the surface of said object in the form of relative large areas of substantially imperforate copper.

2. The process of coating a metallic object with copper which comprises preparing an aqueous mixture of a non-carbonaceous fusible character containing inorganic material including a slagging agent and a halide of a member of the alkali family and copper particles, coating the metallic object with the material constituting said mixture, heating a chamber to a high temperature by the combustion of a gaseous fuel, passing the products of combustion through the chamber, exposing the coated metallic object to the high temperature existing in the said chamber to weld the copper to the surface of the object, and to itself, so as to constitute, on the object, a relatively large area of a substantially imperforate adherent copper coating.

3. The process of coating a metallic object of ferrous character with copper which comprises preparing an aqueous pool of a non-carbonaceous character containing a halide of sodium, borax, silicate of soda, and a copper-bearing material, passing the metallic object through said pool to wet the surfaces of said object with the material in the bath, producing a high temperature in a chamber by the combustion of natural gas, maintaining the metallic object in the said chamber under the influence of the high temperature for a duration sufficiently long to weld the copper to the surface of the object and to itself and to cause the formation of a molten layer of material containing the aforesaid halide of sodium, borax, and silicate of soda which protects the copper while undergoing welding from oxidation, and cooling the aforesaid object to cause solidification of the layer of coating material.

4. The process of coating a ferrous object with copper which comprises surfacing the object with a slagging material of non-carbonaceous, fusible character containing sodium fluoride and fine particles of copper, heating the thus surfaced object to temperatures in the neighborhood of the melting point of copper in an atmosphere produced by the combustion of a fuel, and removing the resultant slag, while leaving the copper as a welded layer.

5. The process of coating a ferrous object with copper which comprises surfacing the object with fine particles of copper in a mixture of borax, sodium silicate, and sodium halide material containing sodium fluoride, heating the thus surfaced object to temperatures in the neighborhood of the melting point of copper in an atmosphere produced by the combustion of a fuel, and removing the resultant slag while leaving the copper as a welded layer.

6. The process of coating a sheet of ferrous material with copper which comprises applying an aqueous mixture containing sodium fluoride, sodium chloride, borax, sodium silicate, and copper to the sheet, passing the coated sheet through a chamber heated to a high temperature by the combustion of natural gas, to cause a welding together of the copper and of the copper to the ferrous sheet in the form of relatively large areas of substantially imperforate copper while protecting the welding copper against oxidizing influences by the fused mixture of the sodium chloride, sodium fluoride, borax, and sodium silicate, cooling the sheet of ferrous material, pickling the cooled sheet in dilute acid to remove scale from the surface of the sheet, cleansing the sheet of said acid and scale, and rolling the sheet to present a smooth copper surface.

In testimony whereof I have hereunto set my hand.

JOSEPH G. DELY.